United States Patent
Bates et al.

(10) Patent No.: US 7,178,135 B2
(45) Date of Patent: Feb. 13, 2007

(54) SCOPE-BASED BREAKPOINT SELECTION AND OPERATION

(75) Inventors: Cary Lee Bates, Rochester, MN (US); Steven Gene Halverson, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 162 days.

(21) Appl. No.: 10/147,737

(22) Filed: May 16, 2002

(65) Prior Publication Data
US 2003/0217354 A1 Nov. 20, 2003

(51) Int. Cl.
*G06F 9/44* (2006.01)
(52) U.S. Cl. .................. 717/129; 717/124; 717/127; 717/128; 717/130; 714/38; 714/39
(58) Field of Classification Search ............... 717/124, 717/126, 127, 129, 128, 160, 130–132, 150; 714/25, 45, 38–39, 47; 712/241; 710/263, 710/260
See application file for complete search history.

(56) References Cited

U.S. PATENT DOCUMENTS

| | | | | |
|---|---|---|---|---|
| 5,319,645 A | * | 6/1994 | Bassi et al. ................ | 714/38 |
| 5,321,828 A | * | 6/1994 | Phillips et al. ............. | 703/28 |
| 5,367,550 A | * | 11/1994 | Ishida ........................ | 377/39 |
| 5,774,724 A | * | 6/1998 | Heisch ...................... | 717/129 |
| 5,802,375 A | * | 9/1998 | Ngo et al. .................. | 717/160 |
| 6,178,499 B1 | * | 1/2001 | Stotzer et al. ............. | 712/241 |
| 6,226,787 B1 | * | 5/2001 | Serra et al. ................ | 717/125 |
| 6,263,489 B1 | * | 7/2001 | Olsen et al. ............... | 717/129 |
| 6,367,032 B1 | * | 4/2002 | Kasahara ................... | 714/25 |
| 6,430,643 B1 | * | 8/2002 | Arndt ........................ | 710/263 |
| 6,467,052 B1 | * | 10/2002 | Kaler et al. ................ | 714/39 |
| 6,553,565 B2 | * | 4/2003 | Click et al. ............... | 717/129 |
| 6,654,948 B1 | * | 11/2003 | Konuru et al. ............ | 717/127 |
| 6,678,884 B1 | * | 1/2004 | Kesselman et al. ....... | 717/129 |
| 6,748,583 B2 | * | 6/2004 | Aizenbud-Reshef et al. ......................... | 717/127 |
| 6,754,754 B1 | * | 6/2004 | Quach et al. .............. | 710/260 |
| 6,817,010 B2 | * | 11/2004 | Aizenbud-Reshef et al. ......................... | 717/127 |
| 6,834,364 B2 | * | 12/2004 | Krech et al. ............... | 714/45 |

OTHER PUBLICATIONS

Title: Monitoring and Performance measuring Distributed Systems during operation, author: Wybranietz et al, ACM, 1988.*
Title: Adapting a debugger for optimized programs, author: Shu, ACM SIGPLAN, Apr. 1993.*

* cited by examiner

*Primary Examiner*—Chameli C. Das
(74) *Attorney, Agent, or Firm*—Patterson & Sheridan

(57) ABSTRACT

Methods, apparatus and articles of manufacture, performed by a debugging program, for executing an operation on a plurality of breakpoints within a scope. In one aspect, the method comprises selecting the scope; determining the plurality of breakpoints within the scope; receiving a selection to execute the operation; and in response to the selection, executing the operation on the plurality of breakpoints within the scope.

34 Claims, 14 Drawing Sheets

FIG. 3

```
224
225  for ( i = 1; i < 100; i++ )
226  {
227      k = i;
228      foo(&k);
229      for ( j = 2; j < 200; j++ )
230      {
231          l = foo22( j + k );
232          ww = l / 22;
233          if ( ww == 199 )
234          while( str[ww] l = 0 )
235          {
236              str[ww] = string_upper(str[ww++]);
237          }
238          foo3(ww);
239      }
240      foo(ww);
241  }
242
```

SCOPE-BASED BREAKPOINT SELECTION AND OPERATION

BACKGROUND OF THE INVENTION

1. Field of the Invention

The present invention generally relates to data processing and more particularly to debugging code.

2. Description of the Related Art

A programmer develops a software program by producing and entering source code into files using a text editor program. The computer then creates an executable program by translating the source code into machine code. The machine code is the rudimentary instructions understood by a computer. Illustratively, the foregoing software development process is accomplished by running a series of programs. These programs typically include a compiler for translating the source code into machine code and a linker to link the machine code together to form a program.

When developing computer software, it is necessary to perform a function termed "debugging". Debugging involves testing and evaluating the software to find and correct any errors and improper logic operation. An effective debugger program is necessary for rapid and efficient development of software and typically provides functions including breakpoints, run-to-cursor, step into, step over and the like.

A conventional debugging system comprises a combination of computer hardware and debugger software that executes a user's program in a controlled manner. Debugging aids a user in identifying and correcting mistakes in an authored program by allowing the program to be executed in small segments. This approach is enabled primarily by two operations: step functions and breakpoints.

A "step" function permits a computer programmer to process instructions (also known as "statements") in a computer program one-by-one, and see the results upon completion of each instruction. While the step operation provides a programmer with a large amount of information about a program during its execution, stepping through hundreds or thousands of program instructions can be extremely tedious and time consuming, and may require a programmer to step through many program instructions that are known to be error-free before a set of instructions to be analyzed are executed.

To address this difficulty, conventional debuggers utilize a breakpoint operation, which permits a computer programmer to identify, with a "breakpoint", a precise instruction for which it is desired to halt execution of a computer program during execution. As a result, when a computer program is executed by a debugger, the program executes in a normal fashion until a breakpoint is reached, and then stops execution and displays the results of the computer program to the programmer for analysis.

Some conventional debuggers support non-conditional breakpoints where the execution of the program is always halted upon reaching the breakpoint. Other debuggers support conditional breakpoints that halt the execution of a program only when a predetermined value, i.e. a condition, is obtained when the breakpoint is encountered.

Breakpoints that are set within a scope typically share common attributes. Thus, if one breakpoint is encountered the rest of the breakpoints are also encountered. While debugging code within the scope, a user frequently executes an operation, such as a disable operation or an enable operation, on the breakpoints within the scope. If the user desires to execute the same operation on all the breakpoints within the scope, the user would have to execute the same operation on each individual breakpoint within the scope. Individually executing the same operation on each breakpoint within the same scope can be tedious and cumbersome, particularly if the number of breakpoints within the scope is significant.

A need therefore exists for a method and apparatus for simultaneously executing the same operation on the breakpoints within the same scope.

SUMMARY OF THE INVENTION

The present invention generally is directed to methods, apparatus and articles of manufacture, performed by a debugging program, for executing an operation on a plurality of breakpoints within a scope. In one aspect, the method comprises selecting the scope; determining the plurality of breakpoints within the scope; receiving a selection to execute the operation; and in response to the selection, executing the operation on the plurality of breakpoints within the scope.

In one embodiment, the present invention is directed to a computer readable medium containing a program which, when executed, performs an operation. The operation comprises: selecting the scope; determining the plurality of breakpoints within the scope; receiving a selection to execute the operation; and in response to the selection, executing the operation on the plurality of breakpoints within the scope.

In another embodiment, the present invention is directed to a computer, comprising: a memory containing a debugging program; and a processor which, when executing the program, performs an operation. The operation comprises: selecting the scope; determining the plurality of breakpoints within the scope; receiving a selection to execute the operation; and in response to the selection, executing the operation on the plurality of breakpoints within the scope.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 is a user interface screen of the user interface in accordance with an embodiment of the present invention;

FIG. 4 illustrates the concept of scopes within code in a computer program in accordance with an embodiment of the present invention;

FIG. 5 illustrates a result of an Expand Scope operation in accordance with an embodiment of the present invention;

FIG. 7 illustrates a result of a Disable operation in accordance with an embodiment of the present invention;

FIG. 8 illustrates a result of a Remove operation in accordance with an embodiment of the present invention;

FIG. 10 illustrates a result of a Condition operation in accordance with an embodiment of the present invention;

FIG. 11 illustrates a further result of a Condition operation in accordance with an embodiment of the present invention.

DETAILED DESCRIPTION OF THE PREFERRED EMBODIMENTS

Figure 1:
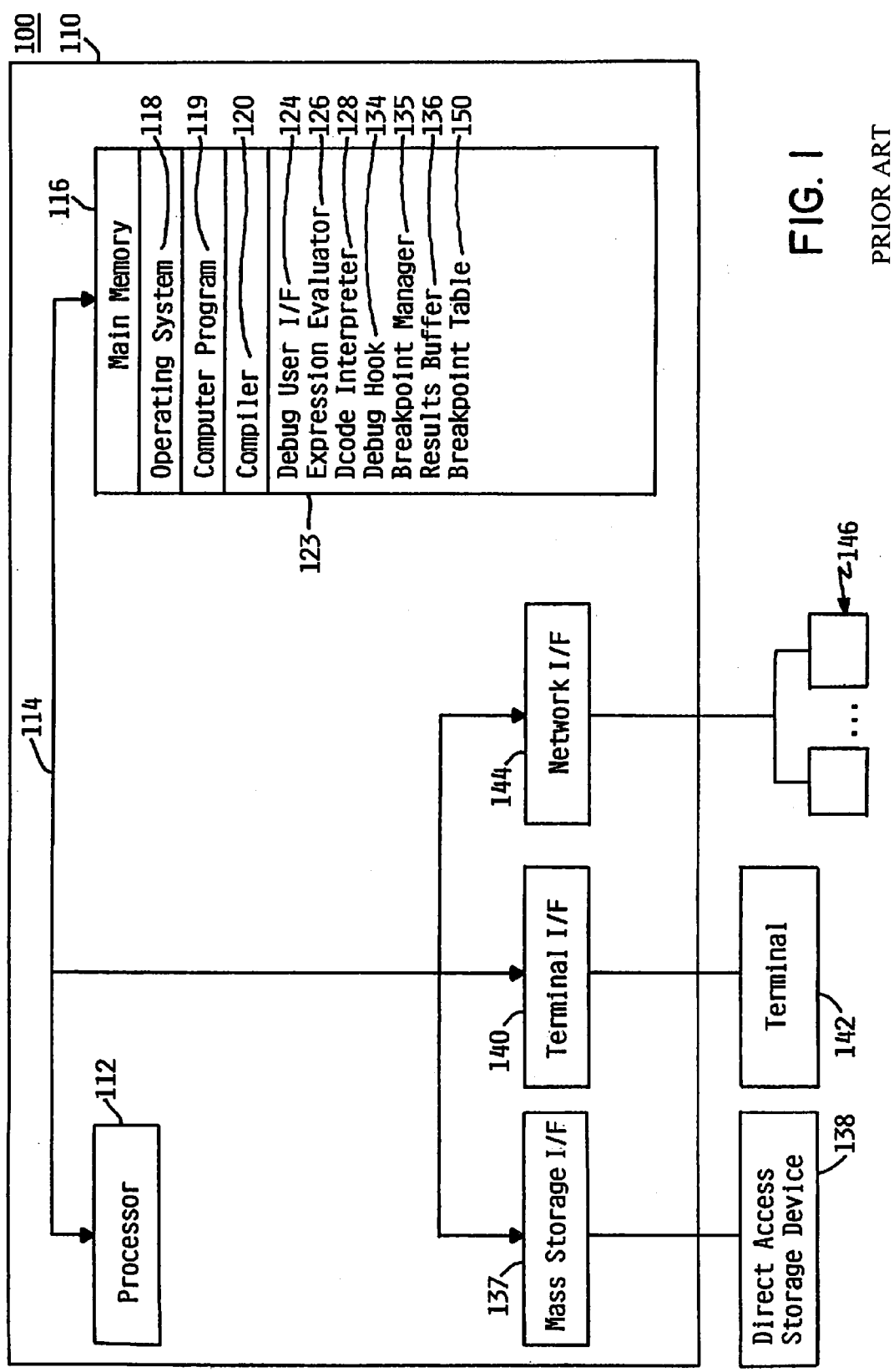
FIG. 1 is a high-level diagram of one embodiment of a computer.

The present invention generally provides methods, apparatus and articles of manufacture for debugging code. In one aspect, the present invention provides a method for executing an operation on all the breakpoints within a selected scope. An operation herein is generally any operation affecting the breakpoints within a selected scope. In one embodiment, the user selects a line for the purpose of selecting a scope that contains the line. In response, the debugger determines an innermost scope that contains the line. The innermost scope therefore becomes the selected scope. The debugger then determines all the breakpoints set within the selected scope. The user then selects an operation to be executed on all the breakpoints within the selected scope. In one embodiment, the user requests the debugger to display a plurality of operation options from which the user may select an operation. Once a particular operation is selected, the debugger executes the operation on the breakpoints within the selected scope. In one embodiment, if the user has selected a Disable operation, then the debugger will disable all the breakpoints within the selected scope. In another embodiment, if the user has selected a Group operation, then the debugger will collect all the breakpoints within the selected scope into a breakpoint group. In yet another embodiment, if the user has a Condition operation, the debugger will prompt the user for a user-specified condition that will be associated with each breakpoint within the selected scope. The debugger then associates the user-specified condition with each breakpoint within the selected scope. If the breakpoint is a conditional breakpoint, the user may be given several options, such as (i) associating the user-specified condition in conjunction with an existing condition of the breakpoint; (ii) replacing the existing condition of the breakpoint with the user-specified condition; and (iii) associating the user-specified condition in disjunction with the existing condition.

One embodiment of the invention is implemented as a program product for use with a computer system such as, for example, the computer system 110 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Referring now to FIG. 1, a computing environment 100 is shown. In general, the distributed environment 100 includes a computer system 110 and a plurality of networked devices 146. For simplicity, only the details of the computer system 110 are shown. However, it is understood that the computer system 110 may be representative of one or more of the networked devices 146. In general, computer system 110 and the networked devices 146 could be any type of computer, computer system or other programmable electronic device, including desktop or PC-based computers, workstations, network terminals, a client computer, a server computer, a portable computer, an embedded controller, etc.

Although shown networked into a larger system, the computer system 110 may be a standalone device. Moreover, those skilled in the art will appreciate that embodiments may be practiced with other computer system configurations including hand-held devices, multiprocessor systems, microprocessor-based or programmable consumer electronics, minicomputers, mainframe computers and the like. The embodiment may also be practiced in distributed computing environments in which tasks are performed by remote processing devices that are linked through a communications network. In a distributed computing environment, program modules may be located in both local and remote memory storage devices. In this regard, the computer system 110 and one or more of the networked devices 146 may be thin clients which perform little or no processing. In a particular embodiment, the computer system 110 is an eServer iSeries 400 computer available from International Business Machines, Corporation of Armonk, N.Y.

The computer system 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions, or operation codes, (also known as opcodes), and data via a bus 114 from a main memory 116. The processor 112 could be any processor adapted to support the debugging methods, apparatus and article of manufacture of the invention. In particular, the computer processor 112 is selected to support the debugging features of the present invention. Illustratively, the processor is a PowerPC available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device or on another computer coupled to the computer system 110 via bus 114.

As shown, the main memory 116 generally includes an operating system 118, a computer program 119, a compiler 120 and debugger program (the debugger) 123. The operating system may be any suitable operating system such as OS/400. The computer program 119 represents any code that is to be examined, edited, compiled and/or debugged. In one embodiment, the debugger 123 is a graphical user interface system debugger for the eServer iSeries computer. OS/400 and eServer iSeries are available from International Business Machines, Corporation of Armonk, N.Y.

Although the software constructs, such as the computer program 119 and the debugger 123, are shown residing on the same computer, a distributed environment is also contemplated. Thus, for example, the debugger 123 may be located on a networked device 146, while the computer program 119 to be debugged is on the computer system 110.

In a specific embodiment, the debugger 123 comprises a debugger user interface 124, expression evaluator 126, Dcode interpreter 128 (also referred to herein as the debug interpreter 128), debugger hook (also known as a stop handler) 134, a breakpoint manager 130, a results buffer 136 and a breakpoint table 150. Although treated herein as integral parts of the debugger 123, one or more of the foregoing components may exist separately in the computer system 110. Further, the debugger may include additional components not shown.

Figure 2:
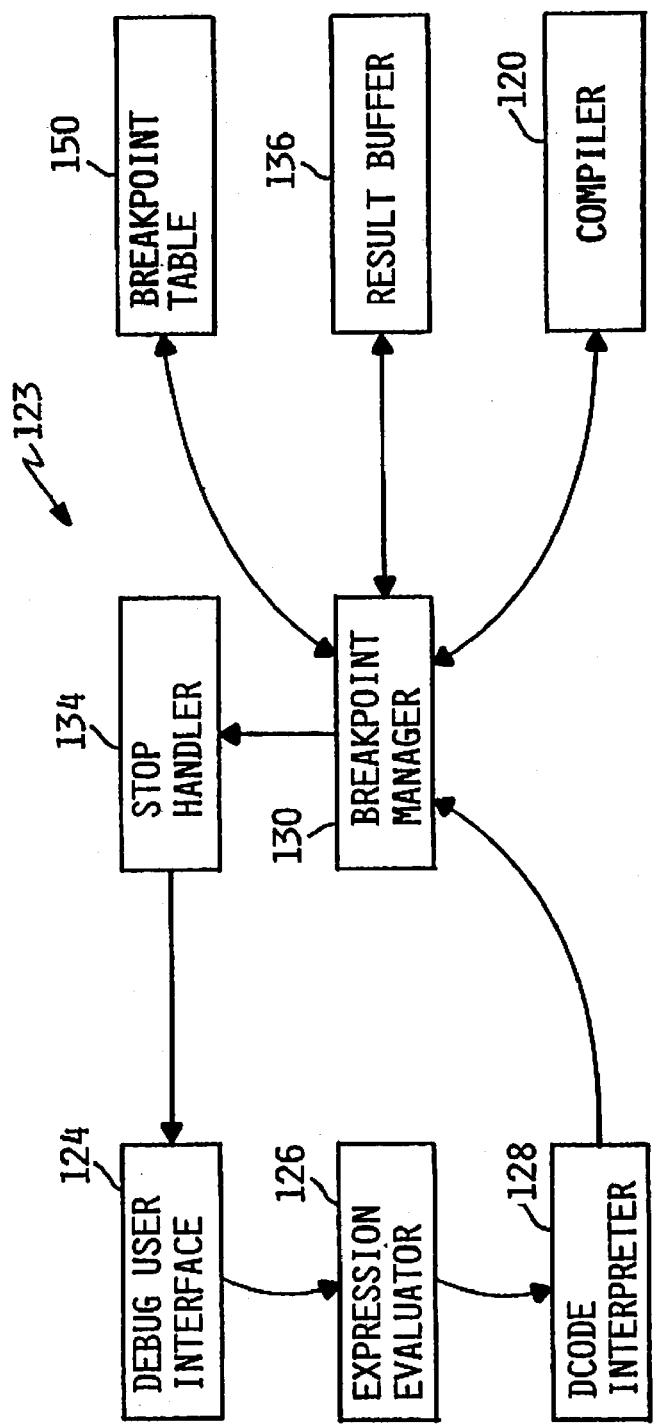
FIG. 2 is a block diagram illustrating the operation of a debugger.

An illustrative debugging process is now described with reference to FIG. 2. A debugging process is initiated by the debug user interface 124. The user interface 124 presents the program under debugging and highlights the current line of the program on which a stop or error occurs. The user interface 124 allows the user to set control points (e.g., breakpoints and watch points), display and change variable values, and activate other inventive features described herein by inputting the appropriate commands. In some instances, the user may define the commands by referring to high-order language (HOL) references such as line or statement numbers or software object references such as a program or module name, from which the physical memory address may be cross-referenced.

The expression evaluator 126 parses the debugger command passed from the user interface 124 and uses a data structure (e.g., a table) generated by the compiler 120 to map the line number in the debugger command to the physical memory address in memory 116. In addition, the expression evaluator 126 generates a Dcode program for the command. The Dcode program is machine executable language that emulates the commands. Some embodiments of the invention include Dcodes which, when executed, activate control features described in more detail below.

The Dcode generated by the expression evaluator 126 is executed by the Dcode interpreter 128. The interpreter 128 handles expressions and Dcode instructions to perform various debugging steps. Results from Dcode interpreter 128 are returned to the user interface 124 through the expression evaluator 126. In addition, the Dcode interpreter 128 passes on information to the stop handler 134, which takes steps described below.

After the commands are entered, the user provides an input that resumes execution of the program 120. During execution, control is returned to the debugger 123 via the stop handler 134. The stop handler 134 is a code segment that returns control to the appropriate user interface. In some implementations, execution of the program eventually results in an event causing a trap to fire (e.g., a breakpoint or watchpoint is encountered). Inserting and managing special op codes that cause these traps to fire is the responsibility of the breakpoint manager 130. When a trap fires, control is then returned to the debugger by the stop handler 134 and program execution is halted. The stop handler 134 then invokes the debug user interface 124 and may pass the results to the user interface 124. Alternatively, the results may be passed to the results buffer 136 to cache data for the user interface 124. In other embodiments, the user may input a command while the program is stopped, causing the debugger to run a desired debugging routine. Result values are then provided to the user via the user interface 124.

Figure 3:
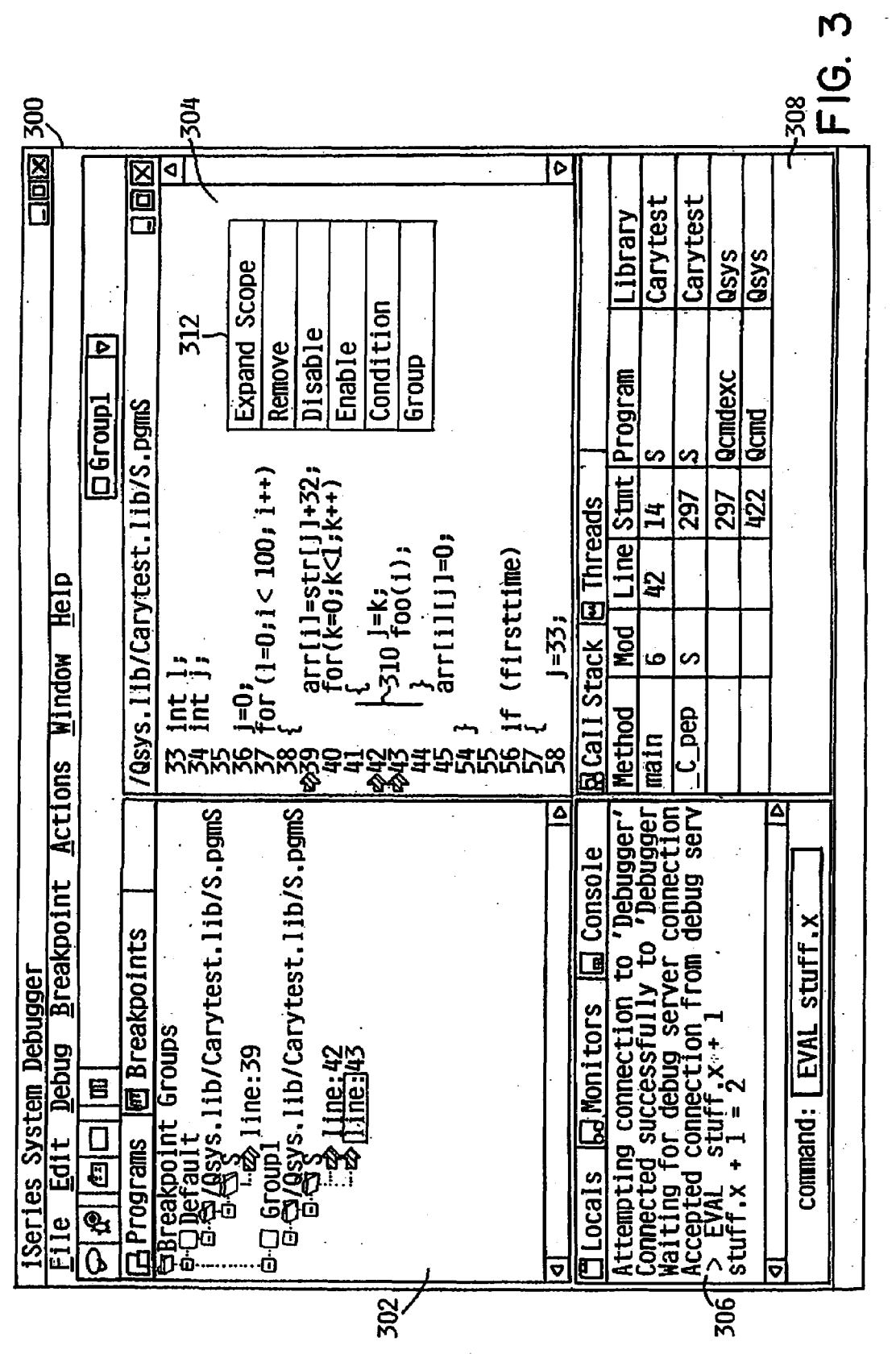

Referring now to FIG. 3, user interface screen 300 of the user interface 124 in accordance with an embodiment of the present invention is illustrated. The user interface screen 300 includes a breakpoint panel 302, a source code panel 304, a local variable panel 306 and a call stack panel 308. The breakpoint panel 302 contains two breakpoint groups—Default and Group 1. The Default breakpoint group indicates that a breakpoint is set on line 39 (as indicated by the black arrow proximate line 39). Group 1 breakpoint group indicates that a breakpoint is set on line 42 and line 43 (as indicated by the black arrow proximate line 42 and line 43).

Line 43 is shown as highlighted, which indicates that line 43 has been selected by a user/developer. In accordance with an embodiment of the present invention, line 43 has been selected for the purpose of identifying or selecting an innermost scope that contains line 43. As used herein, the term "scope" refers to a software language construct of the source code for the computer program 120. For example, a while loop defines a scope.

Referring now to FIG. 4, illustrative source code for the computer program 119 is shown. In this example, three scopes are shown. The innermost scope is defined by the while loop beginning at line 235 and ending at line 237. Moving progressively outwardly, the next innermost loop is a for loop beginning at line 230 and ending at line 239. Finally, the outermost loop is a for loop beginning at line 226 and ending at line 241.

Returning to FIG. 3, in response to selecting line 43, the innermost scope that contains line 43 is determined or selected. In one embodiment, the range of the innermost scope of line 43 is graphically represented by a scope range bar 310. Since the range for the selected scope begins at line 41 and ends at line 44, the scope range bar 310 extends from line 41 to line 44.

If the user desires to execute an operation on all the breakpoints within the selected scope, a dialog box, such as, the context menu 312 may be invoked (e.g., by right clicking on the scope range bar 310). The context menu 312 provides the user with several options for operation, including an Expand Scope operation, a Remove operation, a Disable operation, an Enable operation, a Condition operation and a Group operation. The context menu 312 is not limited by the operations displayed in FIG. 3. Other operations may be included in the context menu 312.

Figure 5:
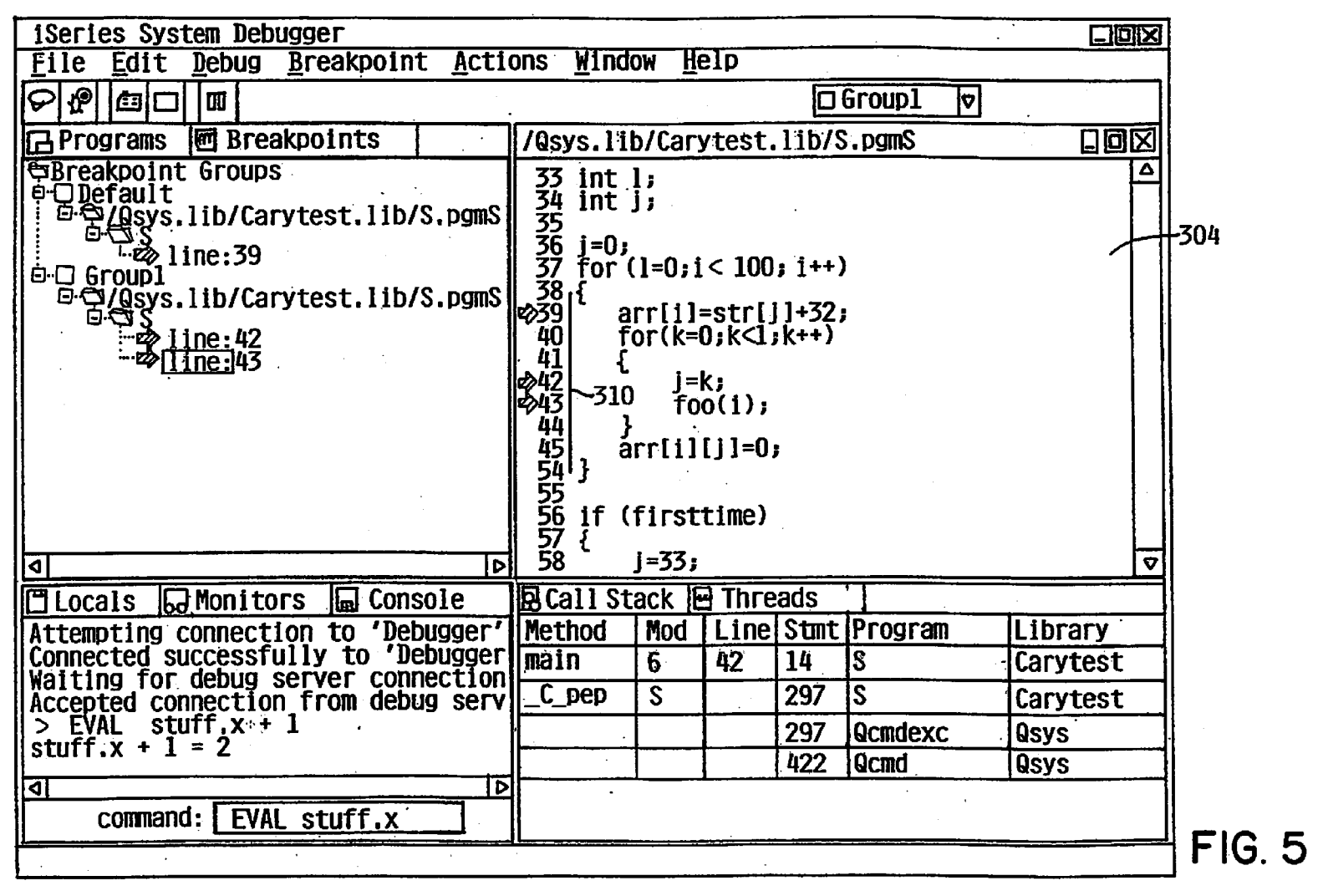

If the Expand Scope operation option is selected, the selected scope is expanded from the innermost scope to the next innermost scope. This expansion is graphically represented by the scope range bar 310 being expanded to include the next innermost scope, as shown in FIG. 5. The expanded scope range bar 310 indicates that the next innermost scope ranges from line 38 to line 54.

Figure 6:
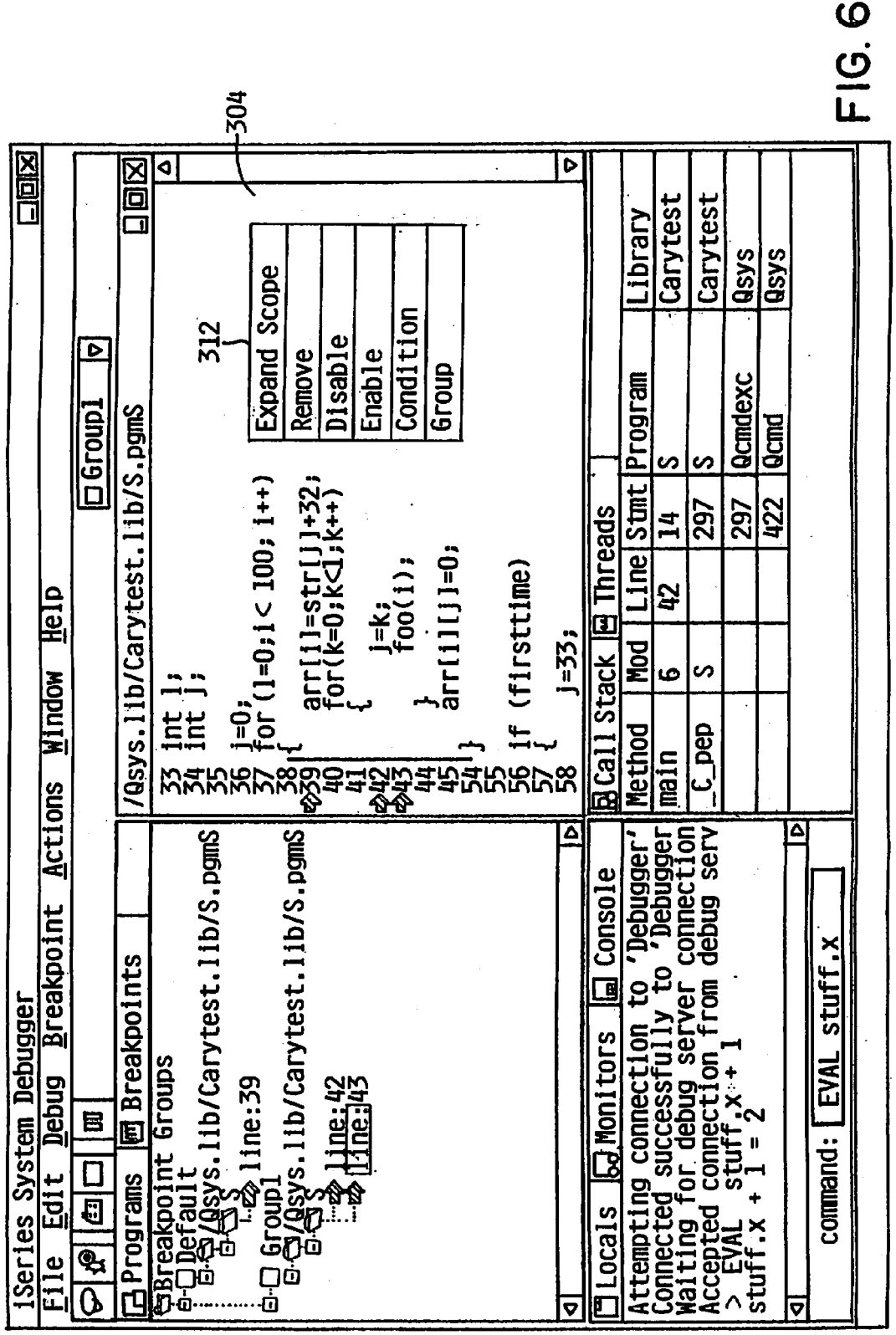
FIG. 6 illustrates another user interface screen of the user interface in accordance with an embodiment of the present invention.
Figure 7:
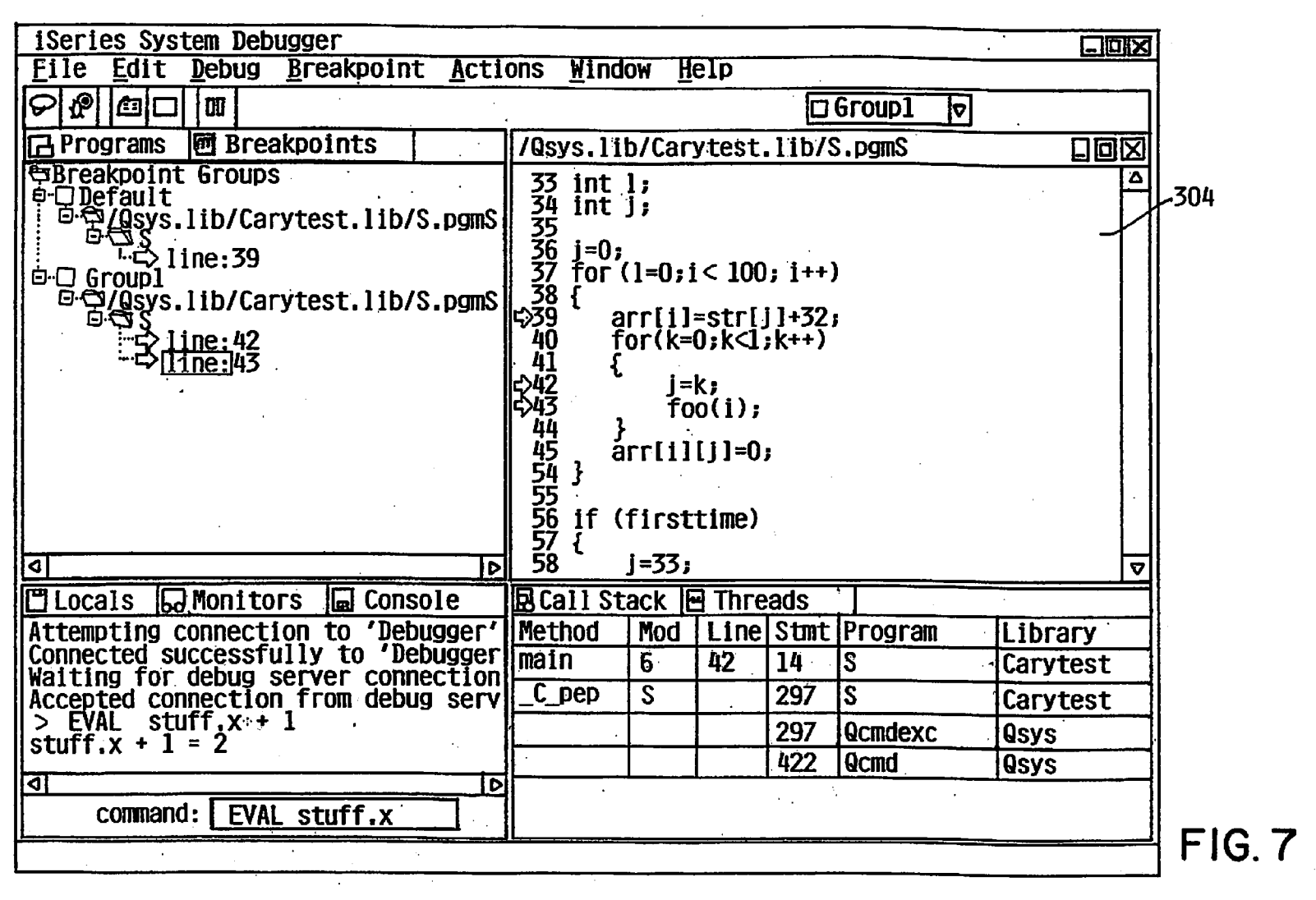

If the user desires to execute another operation on all the breakpoints within the selected scope, the context menu 312 may be invoked again, as shown in FIG. 6. If the Disable operation option is selected from the context menu 312, the breakpoints within the selected scope will be disabled. FIG. 7 illustrates the result of selecting the Disable operation in accordance with an embodiment of the present invention. As shown in FIG. 7, the black arrows proximate each position at which the breakpoint is set are changed to white arrows, thus indicating that the breakpoints within the next innermost scope (ranging from line 38 to line 54) set on line 39, line 42 and line 43 are disabled. The white arrows here are used to indicate that the breakpoints have been disabled. Other indicators, of course, may be used to indicate that the breakpoints have been disabled. In one embodiment, the breakpoints outside of the selected scope would remain enabled.

Figure 8:
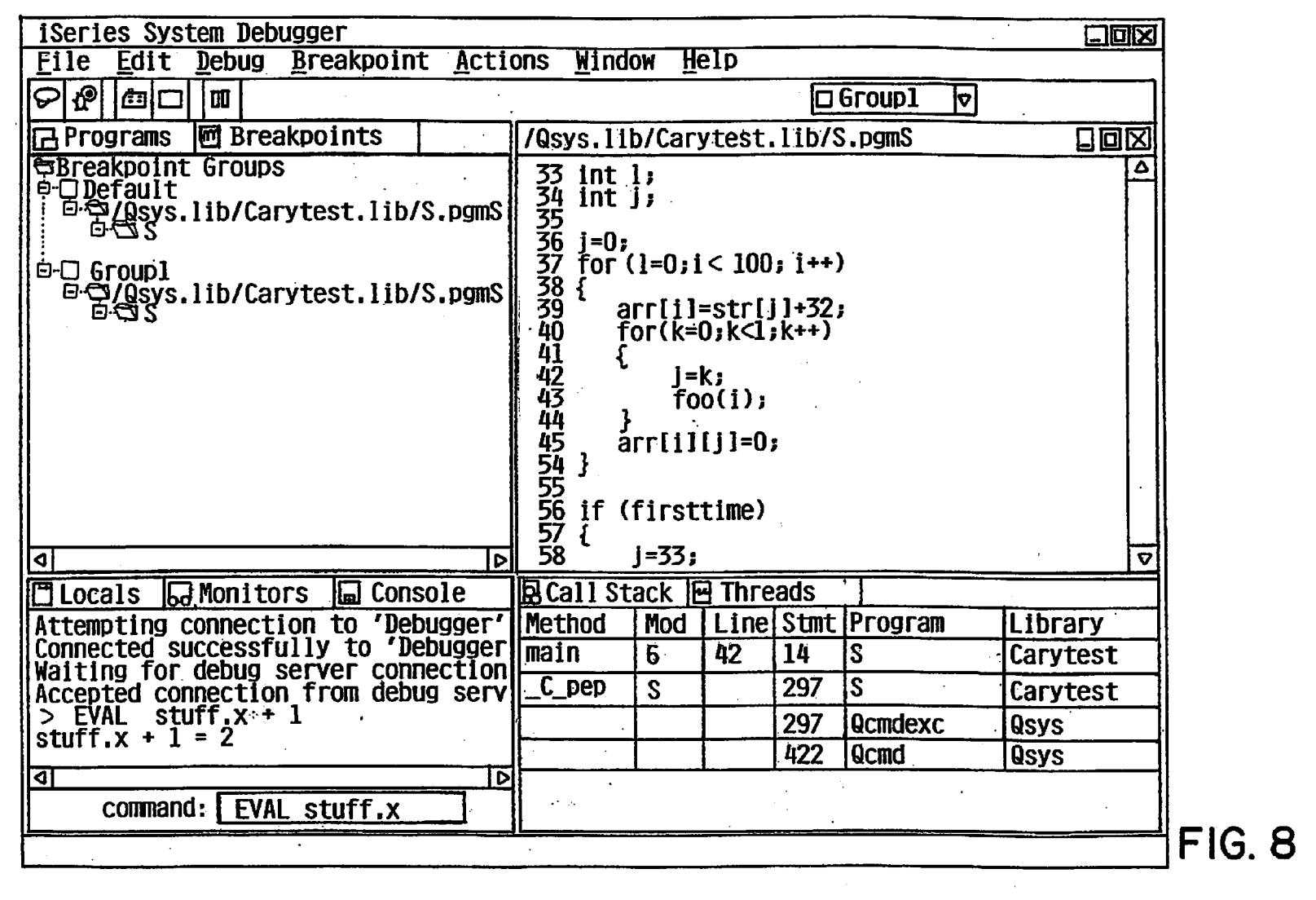

Referring back to FIG. 6, if the Remove operation option is selected, then all the breakpoints within the selected scope will be removed from the selected scope. FIG. 8 illustrates the result of selecting the Remove operation option in accordance with an embodiment of the present invention. As shown in FIG. 8, the black arrows proximate each position at which the breakpoint is set have been removed, thus indicating that the breakpoints set on line 39, line 42 and line 43 have been removed.

Figure 9:
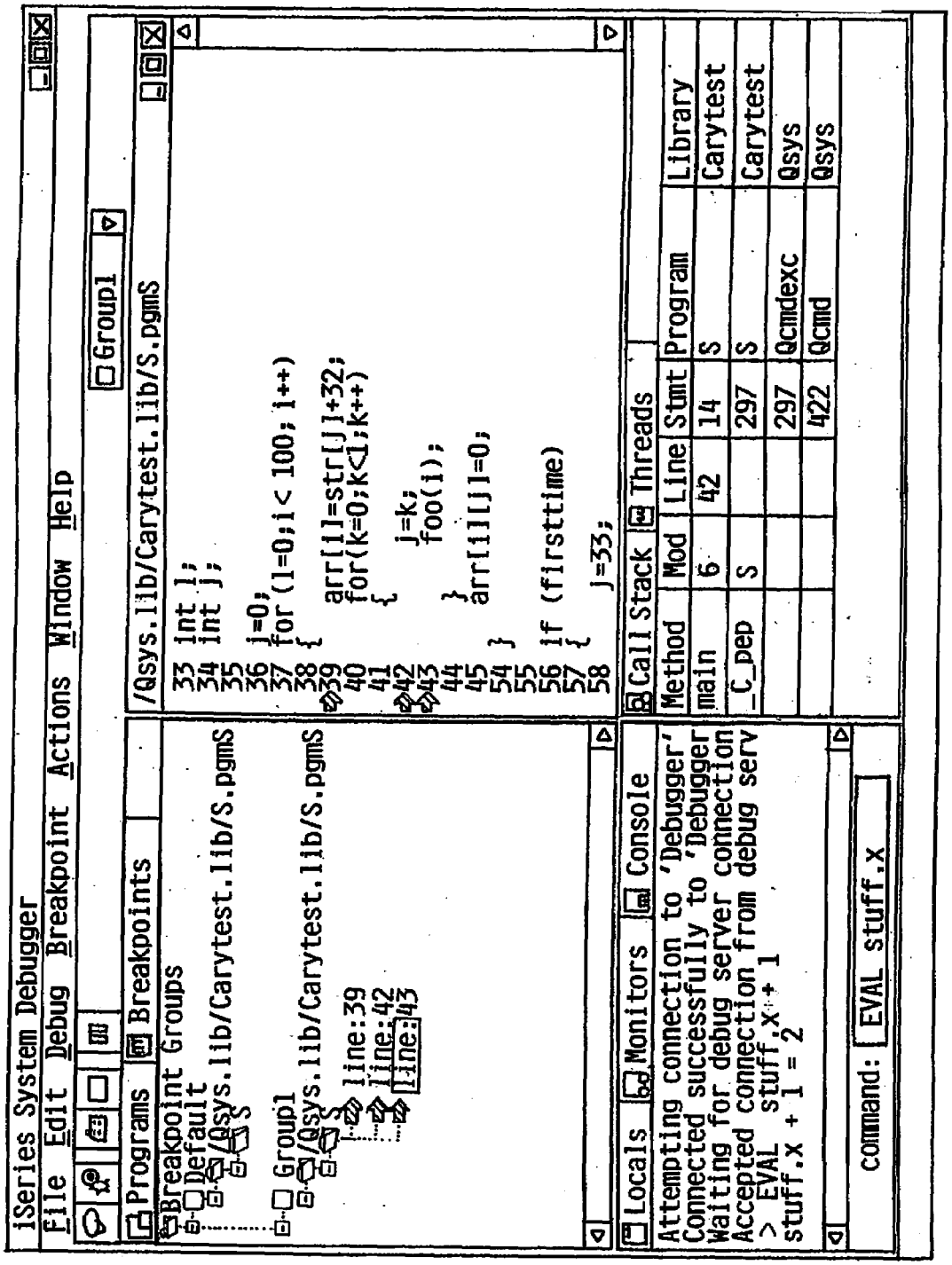
FIG. 9 illustrates a result of a Group operation in accordance with an embodiment of the present invention.

Referring back to FIG. 6, if the Group operation option is selected, then all the breakpoints within the selected scope will be collected into one breakpoint group. FIG. 9 illustrates the result of selecting the Group operation option in accordance with an embodiment of the present invention. As shown in FIG. 9, the breakpoints set on line 39, line 42 and line 43 have been collected under Group 1 breakpoint group. Previously, the breakpoint set on line 39 was listed under the Default breakpoint group (see FIG. 6). However, after the Group operation option is selected, the breakpoint set on line 39 is listed under the Group 1 breakpoint group.

Figure 10:
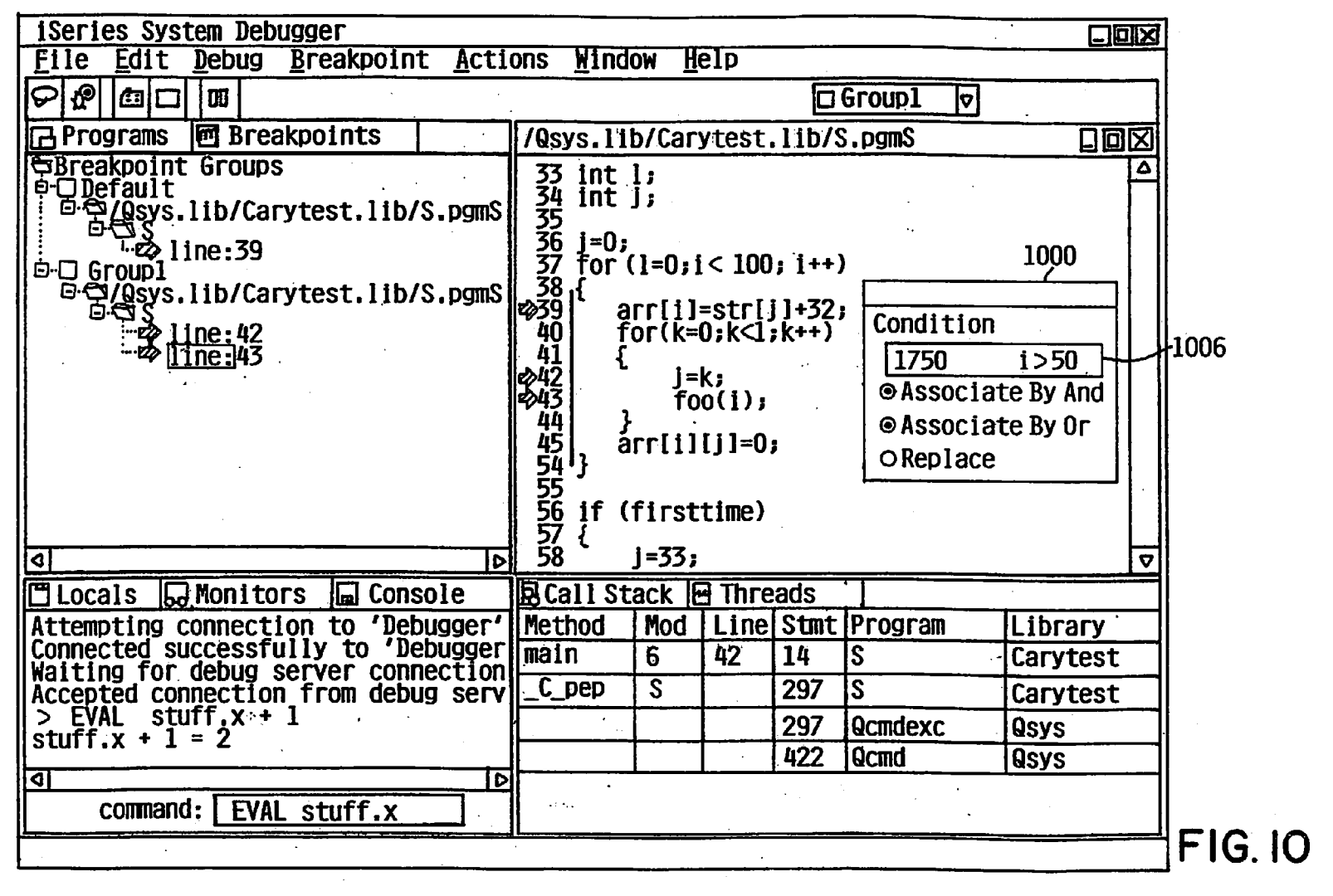

Referring back to FIG. 6, if the Condition operation option is selected, then each breakpoint within the selected scope will be associated with a user-specified condition. FIG. 10 illustrates the result of selecting the Condition operation option in accordance with an embodiment of the present invention. In one embodiment, in response to selecting the Condition operation option, a condition dialog box 1000 is displayed. The condition dialog box 1000 is configured with a condition entry field 1006, an Associate By And option, an Associate By Or option and a Replace option. The condition entry field 1006 is the field where the user can input the user-specified condition.

The Associate By And option is configured to associate the user-specified condition with each breakpoint in the selected scope. If the breakpoint is a non-conditional breakpoint, then the Associate By And option will associate the user-specified condition with the non-conditional breakpoint, thus changing the non-conditional breakpoint to a conditional breakpoint. If the breakpoint is already a conditional breakpoint, then the Associate By And option will form a conditional expression that is a conjunction or combination (logical AND statement) of the user-specified condition and the existing condition.

The Associate By Or option is configured to associate the user-specified condition with each breakpoint in the selected scope. Like the Associate By And option, if the breakpoint is a non-conditional breakpoint, then the Associate By Or option will associate the user-specified condition with the non-conditional breakpoint, thus changing the non-conditional breakpoint to a conditional breakpoint. On the other hand, if the breakpoint is already a conditional breakpoint, then the Associate By Or option will form a conditional expression that is a disjunction (logical OR statement) of the user-specified condition and the existing condition. The Replace option is configured to replace the existing condition with the user-specified condition.

Figure 11:
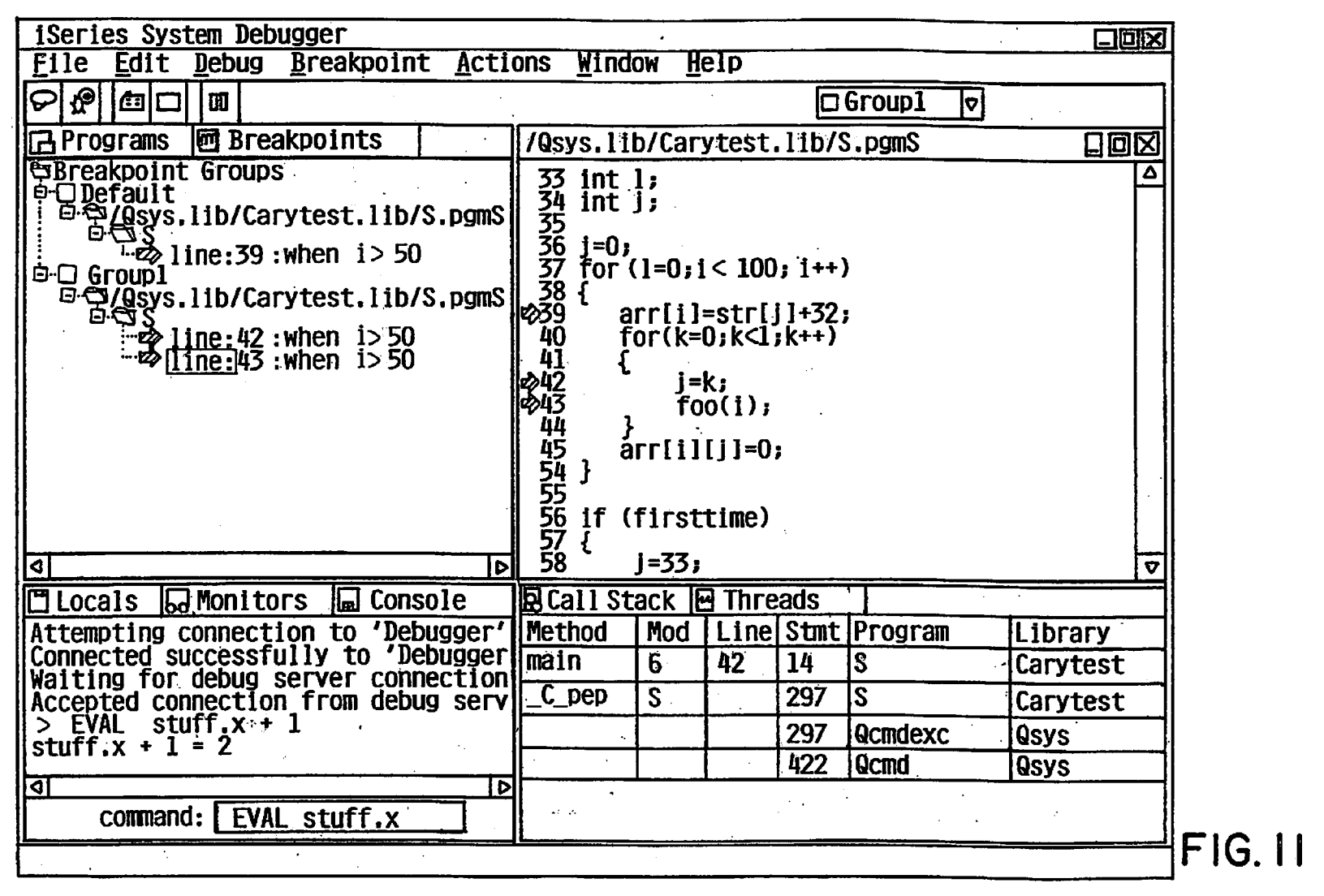

FIG. 10 further illustrates that the user has entered "i>50" as the user-specified condition and has selected the Associate By And option. Consequently, the user-specified condition "i>50" is associated with each breakpoint in the selected scope (set on line 39, line 42 and line 43), as indicated by the expression "when i>50" proximate each line in FIG. 11.

Figure 12A:
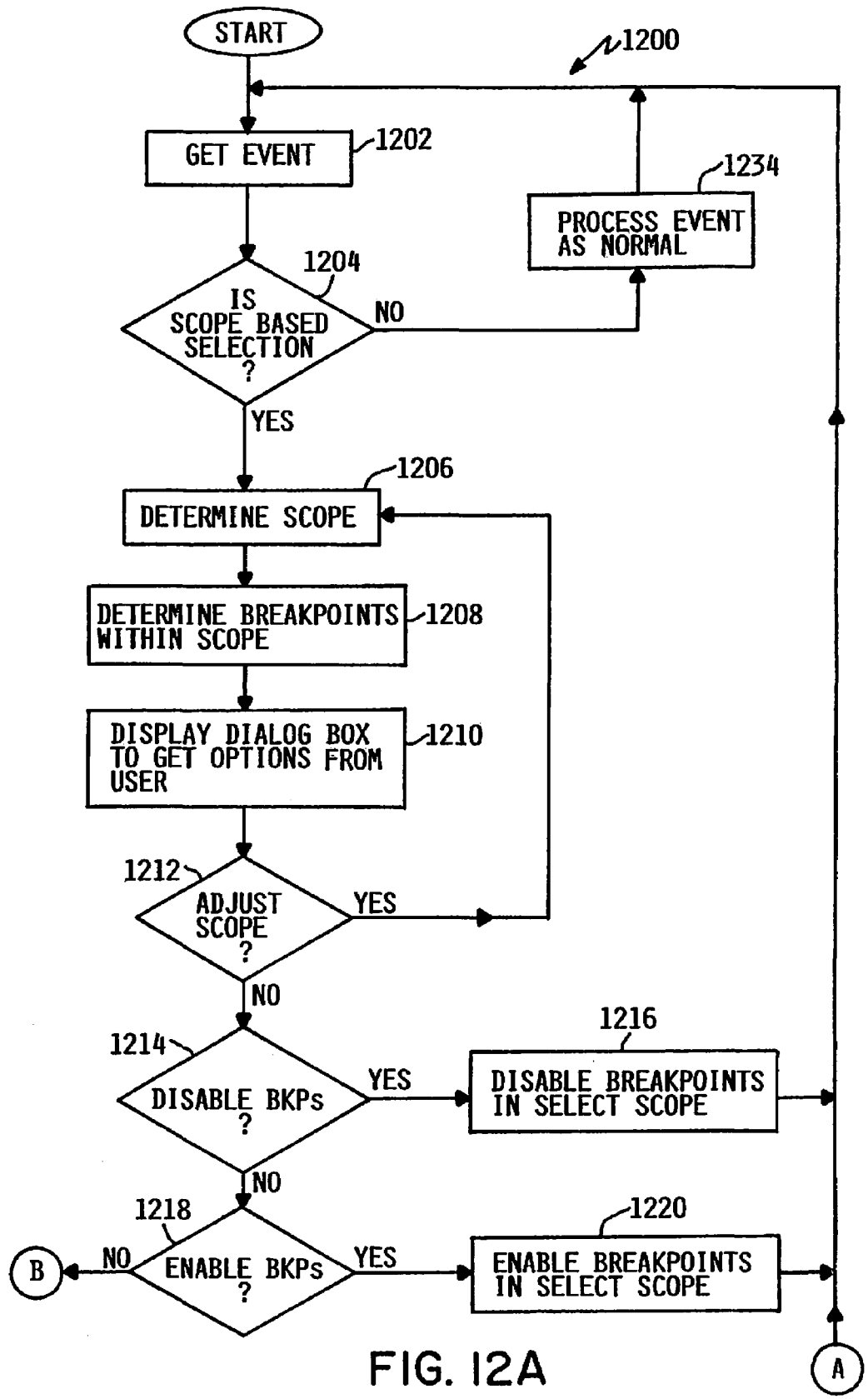
FIGS. 12A–12C illustrate a method of operating the debugger in a manner consistent with embodiments of the present invention.
Figure 12B:
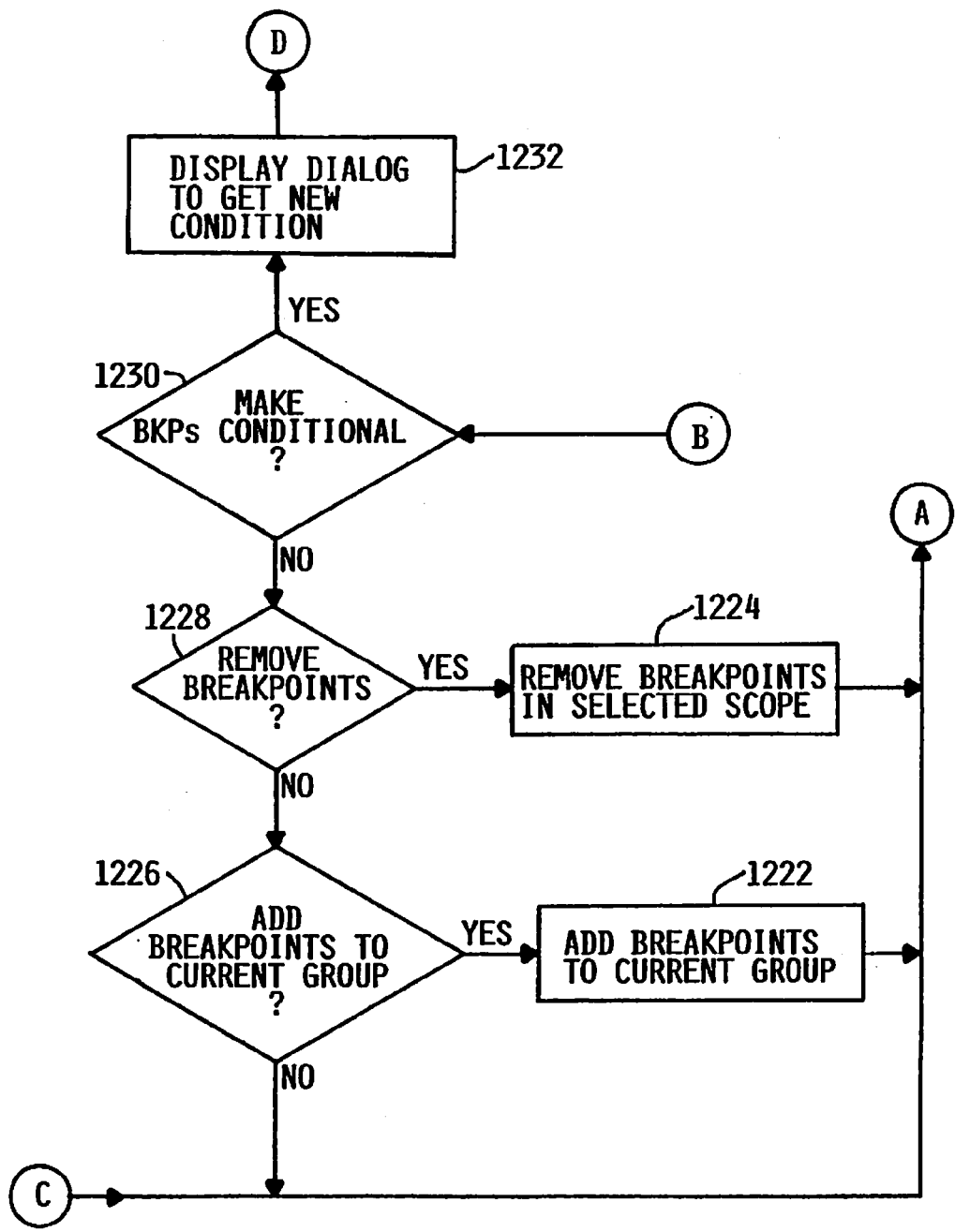
Figure 12C:
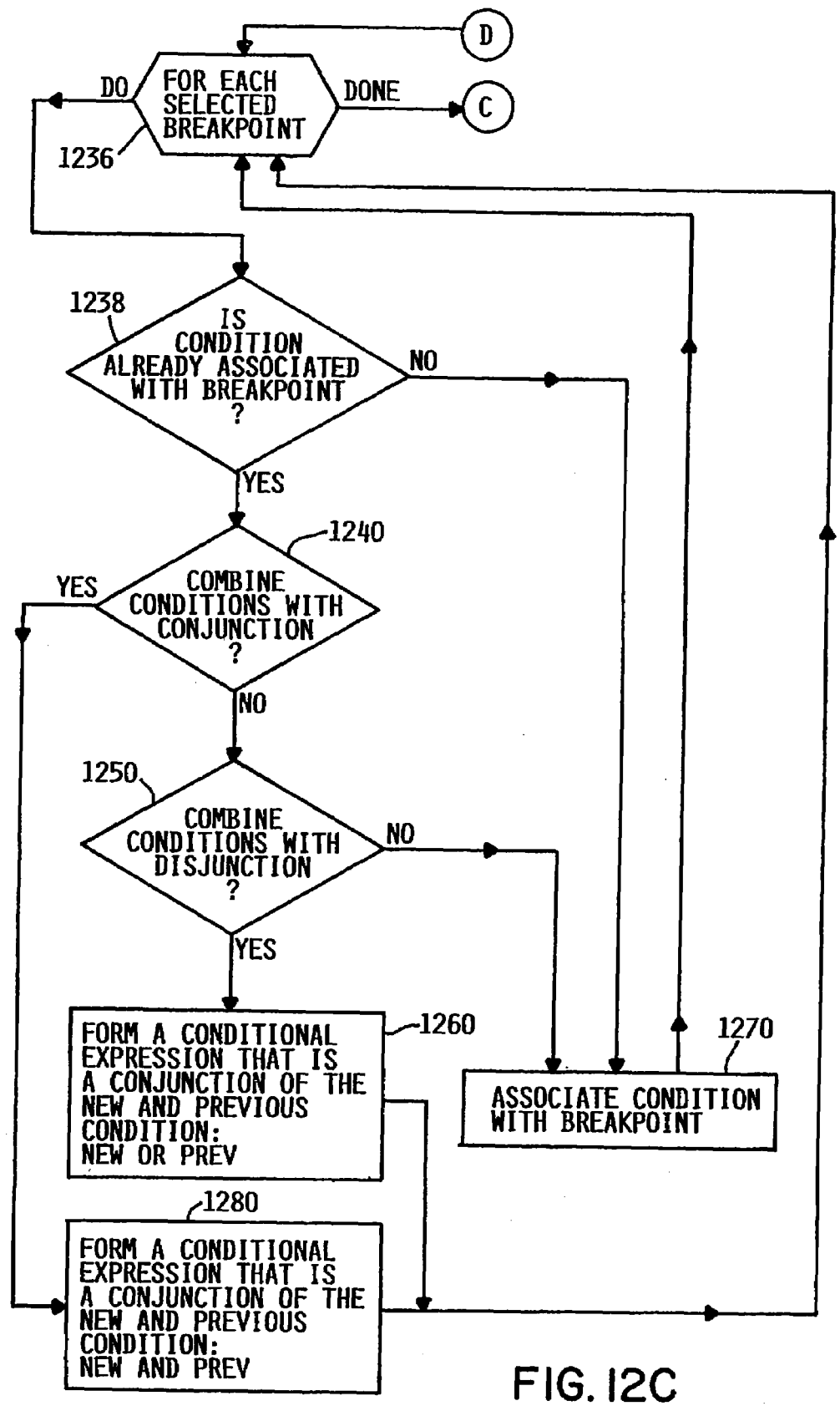

Referring now to FIGS. 12A–C, a method 1200 of operating the debugger 123 in a manner consistent with embodiments of the present invention is shown. Upon receiving a debug event (step 1202), the debugger 123 determines whether the debug event is a selection of a line for the purpose of identifying or selecting the innermost scope that contains the selected line (step 1204). The selection may be made by various means, such as, right clicking on the selected line or left clicking on the selected line while holding down an Alt-key. If the debug event is not a selection of a line for the purpose of identifying the innermost scope, then the debug event is handled in an appropriate manner according to the design of the debugger 123 (step 1234). Examples for such a debug event include events for asking variable values, setting the breakpoints, and scrolling the screen up and down. Processing then returns to step 1202 at which the debugger 123 waits for the next debug event.

On the other hand, if the debug event is a selection of a line for the purpose of identifying or selecting the innermost scope that contains the selected line, such as line 43 in FIG. 3, then the range of the innermost scope that contains the line is determined (step 1206). In one embodiment, if the innermost scope for the selected line cannot be determined, then processing will return to step 1202 at which the debugger 123 waits for the next debug event. In another embodiment, the range of the selected scope is determined from data, such as nesting data, generated by the compiler 120. In yet another embodiment, once the range of the selected scope is determined, the range is graphically represented by a scope range bar, such as the scope bar 310 shown in FIG. 3.

At step 1208, the breakpoints within the selected scope is determined. Once the breakpoints are determined, a dialog box, such as the context menu 312, is displayed to the user if the user invoked the dialog box, e.g., by right clicking on the scope range bar (step 1210). The dialog box here provides the user with several options for operation, including an Expand Scope operation, a Remove operation, a Disable operation, an Enable operation, a Condition operation and a Group operation. Each option has been predefined to execute a certain operation, as previously described.

At step 1212, a determination is made as to whether the user has selected the Expand Scope operation option. If so, then the selected scope is expanded to the next innermost scope. In one embodiment, the scope range bar is expanded to include the range of the next innermost scope. For instance, in FIG. 5, the scope range bar 310 is expanded to the next innermost scope, which ranges from line 38 to line 54. If the user has not selected the Expand Scope operation option, processing continues to step 1214.

At step 1214, a determination is made as to whether the user has selected the Disable operation option. If so, the breakpoints within the selected scope are disabled (step 1216). In one embodiment, a white arrow is placed proximate each position at which the breakpoint is set to indicate that the breakpoint has been disabled. For instance, a white arrow is placed proximate the positions on line 39, line 42 and line 43 in FIG. 7. Processing then returns to step 1202. If the user has not selected the Disable operation option, processing continues to step 1218.

At step 1218, a determination is made as to whether the user has selected the Enable operation option. If so, the breakpoints within the selected scope are enabled (step 1220). In one embodiment, a black arrow is placed proximate each position at which the breakpoint is set to indicate that the breakpoint has been enabled. For instance, a black arrow is placed proximate the positions on line 39, line 42 and line 43 in FIG. 5. Processing then returns to step 1202. If the user has not selected the Enable operation option, processing continues to step 1230.

At step 1230, a determination is made as to whether the user has selected the Condition operation option. If so, a condition dialog box, such as the condition dialog box 1000 in FIG. 10, is displayed to prompt the user for a user-specified condition (step 1232). In one embodiment, the user is given the option to associate the user-specified condition with each breakpoint as either a conjunction with an existing condition of the breakpoint, a disjunction with the existing condition of the breakpoint, or a replacement of the existing condition. For instance, in FIG. 10, the user has entered "i>50" as the user-specified condition and has selected to associate the user-specified condition as a conjunction with the existing condition. Upon receiving the user-specified condition, the user-specified condition is associated with each breakpoint according to the manner in which the user-specified condition is to be associated (steps 1236–1280).

At step 1238, for each breakpoint within the selected scope, a determination is made as to whether the breakpoint to be associated is a conditional breakpoint. If the breakpoint is not a conditional breakpoint, then the breakpoint is associated with the user-specified condition (step 1270). Processing then returns to step 1236 where the next breakpoint within the scope will be processed. Referring back to step 1238, if the breakpoint is a conditional breakpoint, then a determination is made as to whether the user-specified condition is to be combined with the existing condition of the conditional breakpoint, forming a conjunction of the two conditions (step 1240). If so, the user-specified condition and the existing condition are combined to form a conditional expression that is a conjunction (logical AND statement) of the user-specified condition and the existing condition (step 1280). Processing then returns to step 1236.

Referring back to step 1240, if the user-specified condition is not to be combined with the existing condition to form a conjunction of the two conditions, then a determination is made as to whether to form a conditional expression that is a disjunction of the user-specified condition and the existing condition (step 1250). If so, the user-specified condition and the existing condition are combined to form a conditional expression that is a disjunction (logical OR statement) of the user-specified condition and the existing condition (step 1260). If not, then the user-specified condition is associated with the breakpoint, thus effectively replacing the existing condition with the user-specified condition (step 1270). Processing then returns to step 1236.

Referring back to step 1230, if the user has not selected the Condition operation option, then a determination is made as to whether the user has selected the Remove operation option (step 1228). If so, all the breakpoints within the selected scope will be removed (step 1224). Processing then returns to step 1202.

If the user has not selected the Remove operation option, then a determination is made as to whether the user has selected the Group operation option (step 1226). If so, all the breakpoints within the selected scope will be collected into one breakpoint group (step 1222). For instance, in FIG. 9, the breakpoints set on line 39, line 42 and line 43 have been collected under Group 1 breakpoint group. Previously, the breakpoint set on line 39 was listed under the Default breakpoint group (see FIG. 6). Processing then returns to step 1202. If the user has not selected the Group operation option, then processing simply returns to step 1202.

While the foregoing is directed to embodiments of the present invention, other and further embodiments of the invention may be devised without departing from the basic scope thereof, and the scope thereof is determined by the claims that follow.

What is claimed is:

1. A computer implemented method, performed by a debugging program, of executing an operation on a plurality of breakpoints within a scope of code under debug, comprising:
    selecting the scope, the breakpoints being within the selected scope prior to the selection of the scope;
    Identifying the plurality of breakpoints within the selected scope;
    receiving a selection to execute the operation; and
    in response to the selection, executing the operation on the plurality of breakpoints within the selected scope, the operation affecting the breakpoints without firing the breakpoints and without executing the code under debug.

2. The method of claim 1, wherein selecting the scope comprises:
    receiving an event selecting a line with a purpose of selecting the scope containing the line; and
    in response to the event, determining the scope containing the line.

3. The method of claim 1, wherein selecting the scope comprises:
    receiving an event selecting a line with a purpose of selecting the scope containing the line; and
    in response to the event, determining an innermost scope containing the line.

4. The method of claim 1 wherein receiving the selection comprises:
    receiving a request to display a dialog box containing a plurality of options, one of the options is configured to execute the operation;
    in response to the request, displaying the dialog box; and
    receiving the selection for the one of the options.

5. The method of claim 1, wherein executing the operation comprises disabling the plurality of breakpoints.

6. The method of claim 1, wherein executing the operation comprises enabling the plurality of breakpoints.

7. The method of claim 1 wherein executing the operation comprises removing the plurality of breakpoints.

8. The method of claim 1, wherein executing the operation comprises collecting the plurality of breakpoints into a breakpoint group.

9. The method of claim 1 wherein executing the operation comprises expanding the scope.

10. The method of claim 1, wherein selecting the scope comprises:
    receiving an event selecting a line with a purpose of selecting the scope containing the line; and in response to the event, determining an innermost scope containing the line; and further comprising expanding the selected scope to a next innermost scope containing the line.

11. The method of claim 1, wherein executing the operation comprises associating a user-specified condition with each one of the breakpoints.

12. The method of claim 1, wherein executing the operation comprises associating a user-specified condition with each one of the breakpoints; and wherein if the each one of the breakpoints is already associated with an existing condition, then associating the user-specified condition as one of a conjunction with the existing condition, a disjunction with the existing condition, and a replacement of the existing condition.

13. A computer readable storage medium containing a debugging program which, when executed, performs an operation on a plurality of breakpoints, comprising:

selecting a scope within a code under debug, the breakpoints being set within the selected scope prior to the selection of the scope;

identifying the plurality of breakpoints within the selected scope;

receiving a selection to execute the operation; and in response to the selection, executing the operation on the plurality of breakpoints within the selected scope, the operation affecting the breakpoints without firing the breakpoints and without executing the code under debug.

14. The computer readable medium of claim 13, wherein selecting the scope comprises:

receiving an event selecting a line with a purpose of selecting the scope containing the line; and in response to the event, determining the scope containing the line.

15. The computer readable medium of claim 13, wherein selecting the scope comprises:

receiving an event selecting a line with a purpose of selecting the scope containing the line; and in response to the event, determining an innermost scope containing the line.

16. The computer readable medium of claim 13, wherein receiving the selection comprises:

receiving a request to display a dialog box containing a plurality of options, one of the options is configured to execute the operation;

in response to the request, displaying the dialog box; and receiving the selection for the one of the options.

17. The computer readable medium of claim 13, wherein executing the operation comprises disabling the plurality of breakpoints.

18. The computer readable medium of claim 13, wherein executing the operation comprises enabling the plurality of breakpoints.

19. The computer readable medium of claim 13, wherein executing the operation comprises removing the plurality of breakpoints.

20. The computer readable medium of claim 13, wherein executing the operation comprises collecting the plurality of breakpoints into a breakpoint group.

21. The computer readable medium of claim 13, wherein executing the operation comprises expanding the scope.

22. The computer readable medium of claim 13, wherein selecting the scope comprises:

receiving an event selecting a line with the purpose of selecting the scope containing the line; and in response to the event, determining an innermost scope containing the line; and further comprising expanding the scope to a next innermost scope containing the line.

23. The computer readable medium of claim 13, wherein executing the operation comprises associating a user-specified condition with each one of the breakpoints.

24. A computer, comprising:

a memory containing a debugging program; and a processor which, when executing the debugging program, performs an operation on a plurality of breakpoints comprising:

selecting a scope within a code under debug, the breakpoint being set within the scope prior to the selection of the scope;

identifying the plurality of breakpoints within the selected scope;

receiving a selection to execute the operation; and in response to the selection, executing the operation on the plurality of breakpoints within the selected scope, the operation affecting the breakpoints without firing the breakpoints and without executing the code under debug.

25. The computer of claim 24, wherein selecting the scope comprises:

receiving an event selecting a line with the purpose of selecting the scope containing the line; and in response to the event, determining the scope containing the line.

26. The computer of claim 24, wherein selecting the scope comprises:

receiving an event selecting a line with a purpose of selecting the scope containing the line; and in response to the event, determining an innermost scope containing the line.

27. The computer of claim 24, wherein receiving the selection comprises:

receiving a request to display a dialog box containing a plurality of options, one of the options is configured to execute the operation;

in response to the request, displaying the dialog box; and receiving the selection for the one of the options.

28. The computer of claim 24, wherein executing the operation comprises disabling the plurality of breakpoints.

29. The computer of claim 24, wherein executing the operation comprises enabling the plurality of breakpoints.

30. The computer of claim 24, wherein executing the operation comprises removing the plurality of breakpoints.

31. The computer of claim 24, wherein executing the operation comprises collecting the plurality of breakpoints into a breakpoint group.

32. The computer of claim 24, wherein executing the operation comprises expanding the scope.

33. The computer of claim 24, wherein selecting the scope comprises:

receiving an event selecting a line with a purpose of selecting the scope containing the line; and in response to the event, determining an innermost scope containing the line; and further comprising expanding the scope to a next innermost scope containing the line.

34. The computer of claim 24, wherein executing the operation comprises associating a user-specified condition with each one of the breakpoints.

* * * * *